. United States Patent [19]
Yap

[11] Patent Number: 5,454,712
[45] Date of Patent: Oct. 3, 1995

[54] AIR-OXY-FUEL BURNER METHOD AND APPARATUS

[75] Inventor: Loo T. Yap, Princeton, N.J.

[73] Assignee: The BOC Group, Inc., New Providence, N.J.

[21] Appl. No.: 121,387

[22] Filed: Sep. 15, 1993

[51] Int. Cl.$^6$ .................................................. F23D 14/22
[52] U.S. Cl. ........................ 431/10; 431/182; 431/187; 431/9
[58] Field of Search ......................... 431/8, 9, 10, 181, 431/187, 350, 182, 183, 184, 188

[56] References Cited

U.S. PATENT DOCUMENTS

| 501,164 | 7/1893 | Roberts. | |
|---|---|---|---|
| 1,304,402 | 5/1919 | Spire. | |
| 2,360,548 | 10/1944 | Conway | 158/117.5 |
| 2,515,845 | 7/1950 | van den Bussche | 110/28 |
| 2,711,214 | 6/1955 | Bloomer | 431/182 X |
| 2,904,417 | 9/1959 | teNuyl | 48/212 |
| 2,986,206 | 5/1961 | Boelsma | 158/4 |
| 3,213,919 | 10/1965 | Calzolari | 158/76 |
| 3,529,917 | 9/1970 | Hindenlang | 431/351 |
| 3,534,909 | 10/1970 | Paine et al. | 239/416 |
| 3,612,737 | 10/1971 | Sharan | 431/183 |
| 3,671,172 | 6/1972 | Chedaille et al. | 431/182 X |
| 3,836,315 | 9/1974 | Shular | 431/9 |
| 3,864,073 | 2/1975 | Kohli | 431/115 |
| 3,905,751 | 9/1975 | Hemsath et al. | 431/183 |
| 3,929,290 | 12/1975 | Tallarovic | 239/417.3 |
| 4,004,875 | 1/1977 | Zink et al. | 431/9 |
| 4,017,253 | 4/1977 | Wielang et al. | 432/58 |
| 4,021,188 | 5/1977 | Yamagishi et al. | 431/10 X |
| 4,023,921 | 5/1977 | Anson | 531/9 |
| 4,214,866 | 7/1980 | Thekdi et al. | 532/12 |
| 4,297,093 | 10/1981 | Morimoto et al. | 431/182 X |
| 4,348,168 | 9/1982 | Coulon | 431/9 |
| 4,375,352 | 3/1983 | Berry et al. | 431/8 |
| 4,412,810 | 11/1983 | Izuha et al. | 431/187 X |
| 4,431,403 | 2/1984 | Nowak et al. | 431/183 |
| 4,483,482 | 11/1984 | Junger et al. | 239/434 |
| 4,509,915 | 4/1985 | Ito | 431/215 |
| 4,541,796 | 9/1985 | Anderson | 431/187 |
| 4,622,007 | 11/1986 | Gitman | 432/13 |
| 4,629,413 | 12/1986 | Michelson et al. | 431/9 |
| 4,642,047 | 2/1987 | Gitman | 432/13 |
| 4,685,882 | 8/1987 | Binasik et al. | 431/182 |
| 4,797,087 | 1/1989 | Gitman | 431/187 X |
| 4,826,084 | 5/1989 | Wallace | 239/290 |
| 4,933,163 | 6/1990 | Fischer et al. | 432/574 |
| 4,976,607 | 12/1990 | Grimard | 431/174 |
| 5,240,410 | 8/1993 | Yang et al. | 431/187 X |

(List continued on next page.)

FOREIGN PATENT DOCUMENTS 2094464  2/1982  United Kingdom.

OTHER PUBLICATIONS

WO, 9110864, Jul. 1991, Dykema.

Primary Examiner—Carl D. Price
Attorney, Agent, or Firm—David M. Rosenblum; Larry R. Cassett

[57] ABSTRACT

The present invention provides an air-oxy-fuel method and apparatus in which fuel is burned in first and second stages of combustion having a fuel-rich and fuel-lean stoichiometry, respectively, to reduce $NO_x$ emissions. The fuel is burned in the first stage of combustion in oxygen. The combustion of the fuel is completed in the second stage of combustion in the presence of air. Mixing of fuel and oxygen is effected by forming fuel and oxygen jets in close proximity to one another. Air is then swirled around the fuel and oxygen jets at a swirl ratio of no less than about 0.6 so that combustion products of the fast stage of combustion recirculate to obtain stable combustion of a very fuel-rich flame which is characterized by increased flame luminosity. The use of air allows for a lesser degree of swirling than had a single oxidant been used in both the fast and second stages of combustion because a greater mass of air is supplied than oxygen. This in turn allows the air to be swirled with a sufficient forward momentum to locate the second stage of combustion directly downstream of the fast stage of combustion.

7 Claims, 3 Drawing Sheets

U.S. PATENT DOCUMENTS

| | | | |
|---|---|---|---|
| 5,044,552 | 9/1991 | Becker et al. | 239/8 |
| 5,049,066 | 9/1991 | Kaiya et al. | 431/352 |
| 5,092,760 | 3/1992 | Brown et al. | 431/10 |
| 5,104,310 | 4/1992 | Saltin | 431/10 |
| 5,131,334 | 7/1992 | Monro | 431/183 X |
| 5,145,361 | 9/1992 | Kurzinski | 432/19 |

AIR-OXY-FUEL BURNER METHOD AND APPARATUS

BACKGROUND OF THE INVENTION

The present invention relates to a method and apparatus for burning a fuel in the presence of oxygen and air. More particularly, the present invention relates to such a burner in which the combustion is staged such that the fuel initially burns at a fuel-rich stoichiometry and then at a fuel-lean stoichiometry in first -and second stages of combustion, respectively. Even more particularly, the present invention relates to such an apparatus and method in which oxygen is used to support combustion in the first stage of combustion and swirled air or oxygen enriched air is employed to support combustion in the second stage of combustion.

In many industrial processes it is necessary to heat a melt, for instance, glass, metals, ferrous and non-ferrous and etc. A variety of burners have been provided for such processes that burn a fuel in the presence of an oxidant that can consist of air, oxygen, or oxygen-enriched air.

Burners that use air alone can generally be said to suffer from a limited operating range, power output and a potential for $NO_x$ formation resulting from combustion of the fuel in airborne nitrogen. In order to reduce $NO_x$ formation, U.S. Pat. No. 4,297,093 provides a burner in which air is swirled around a fuel jet to produce a fuel rich zone of combustion surrounded by a fuel lean zone of combustion. Combustion of the fuel in such a manner reduces $NO_x$ formation and the swirling air acts to insolate the burner from the flame.

In order to increase the operating range and available power output of the burner, oxy-fuel burners have been developed that utilize oxygen as the oxidant. Such burners are compact and are able to produce a high energy output from both the rate at which fuel is burned and the luminosity of the flame. Their disadvantage is that the flame they produce can result in high localized heat fluxes that develop hot spots in the melt. Moreover, the use of oxygen adds to the costs of the process involved. In order to conserve oxygen, burners termed in the art as air-oxy-fuel burners have been developed in which a portion of the oxidant is supplied by air to reduce the costs involved in burning a fuel in oxygen alone. A potential problem with such burners, is that they are more likely to produce high amounts of $NO_x$ than burners that use just air to supply the oxidant.

An example of an air-oxy-fuel burner is U.S. Pat. No. 5,145,361 in which air is aspirated in either a flow of fuel gas or oxygen and the resultant mixture is swirled to spread out the area in which the flame burns. A high potential for $NO_x$ formation exists in the type of combustion contemplated in the '361 patent. U.S. Pat. No. 4,642,047 discloses another air-oxy-fuel burner in which fuel and oxygen are burned at a fuel-rich stoichiometry in the core of the flame and air is tangentially introduced about the flame core to blanket the flame for insulating purposes and to complete combustion of the fuel. The lack of air in the core of the flame inhibits $NO_x$ formation. The '047 patent is not unlike the '093 patent discussed above. Both of these patents contemplate radially stratified fuel rich and fuel lean zones to lessen $NO_x$ formation. In producing such stratified zones, however, the ability of the flame to be outwardly projected is greatly diminished over burners in which fuel and oxidant mix in an axial direction of the flame. As a result, also the '047 patent requires water cooling to prevent destruction of the burner resulting from intense burning in close proximity to the burner. Forward projection of the flame away from the burner is essential to provide for good heat transfer to a thermal load and allows self cooling of the burner.

As will be discussed, the present invention provides an air-oxy-fuel burner that is able to project a flame at a lower oxygen consumption than the burners set forth in patents mentioned above and which is designed to inhibit $NO_x$ formation.

SUMMARY OF THE INVENTION

The present invention provides a method of burning fuel. In accordance with the method fuel and an oxygen are introduced into a first stage of combustion such that the fuel and the oxygen burn at a fuel-rich stoichiometry to produce unburned fuel and combustion products. The unburned fuel from the first stage of combustion and an oxidant comprising air or oxygen-enriched air is introduced into a second stage of combustion, located downstream of the first stage of combustion, such that combustion of the fuel is completed at a fuel-lean stoichiometry. The fuel and the oxygen are introduced into the first stage of combustion by forming convergent jets of the fuel and the oxidant. Here it is appropriate to point out that the term "convergent" as used herein and in the claims does not require that the fuel and oxygen jets be directed at one another. The fuel and oxygen jets could be parallel and the divergence of each of the jets could produce the required overall convergence needed for fuel and oxygen to mix. The unburned fuel and the oxidant are introduced into the second stage of combustion by swirling the air around the fuel and the oxidant jets with tangential and axial momentums. The tangential momentum of the oxidant is sufficient to form a recirculation zone in the first stage of combustion in which heated combustion products circulate at right angles to the swirl of oxygen. The axial momentum of the oxidant is sufficient to project the oxidant and therefore the second stage of combustion downstream of the first stage of combustion.

In another aspect, the present invention provides an air-oxy-fuel burner. The burner comprises a fuel burner having a means for forming convergent fuel and oxygen jets such that the fuel and the oxygen are introduced into a first stage of combustion at a fuel-rich stoichiometry to form unburned fuel and combustion products. An air shroud surrounds the fuel burner for supplying an oxidant comprising air or oxygen-enriched air to complete combustion of the unburned fuel in a second state of combustion having a fuel-lean stoichiometry. The air shroud has a means for swirling the oxidant around the fuel and the oxygen jets with a sufficient tangential velocity that a recirculation zone is set up in the first stage of combustion in which the combustion products recirculate at right angles to the swirl of the oxidant. Additionally, the swirled oxidant has a sufficient axial velocity that the oxidant and therefore the second stage of combustion is projected directly downstream of the first stage of combustion.

The oxygen and air or oxygen-enriched air act in concert to produce the benefits of the present invention. The oxygen in combination with the established recirculation zone allow the first combustion stage to be very stable at very fuel-rich conditions. The air or oxygen-enriched air is more massive than the oxygen or put another way, more of the oxidant per unit volume of oxygen is supplied to the second stage of combustion. Hence, to produce a recirculation in the first zone, the air or oxygen-enriched air does not have to swirled to a very great extent. As such, most of the momentum of the air or oxygen-enriched air can be taken up in forward, axial momentum to project the second stage of combustion downstream from the first stage of combustion. This is to be contrasted from such prior art patents as discussed above in which fuel-rich and fuel-lean zones are radially stratified to create a flame that is not as projected as the flame produced in accordance with the present invention.

As is evident, the present invention employs staged combustion to help lessen $NO_x$ emissions. Primarily this is through a large stratification in stoichiometries as well as increased flame cooling through more effective flame radiation. Typically, in staged combustion an oxidant is staged into a fuel to create fuel-rich and fuel-lean zones. In the subject invention, there are two oxidants that are being staged into the fuel, namely oxygen to support combustion in the fuel-rich zone and another oxidant, air or oxygen-enriched air, to support combustion of the unburned combustion products in the fuel-lean zone. The oxygen in combination with the established recirculation zone allow the first combustion stage to be very stable at very rich conditions and extends the stoichiometry range under which stable operation is possible. The flame luminosity increases the radiant power output of the burner for a given oxygen consumption rate for the rich first stage of combustion. It is the radiant output which in most industrial furnaces determines the thermal efficiency of the process.

Thus, the present invention can be said to have the advantage of increased radiant power output, with decreased oxygen consumption for a given power output and reduced $NO_x$ emissions.

BRIEF DESCRIPTION OF THE DRAWINGS

While the specification concludes claims particularly pointing out and distinctly claiming the subject matter that Applicant regards as his invention, it is believed that the invention will be better understood when taken in conjunction with the accompanying drawings in which:

DETAILED DESCRIPTION

Figure 1:
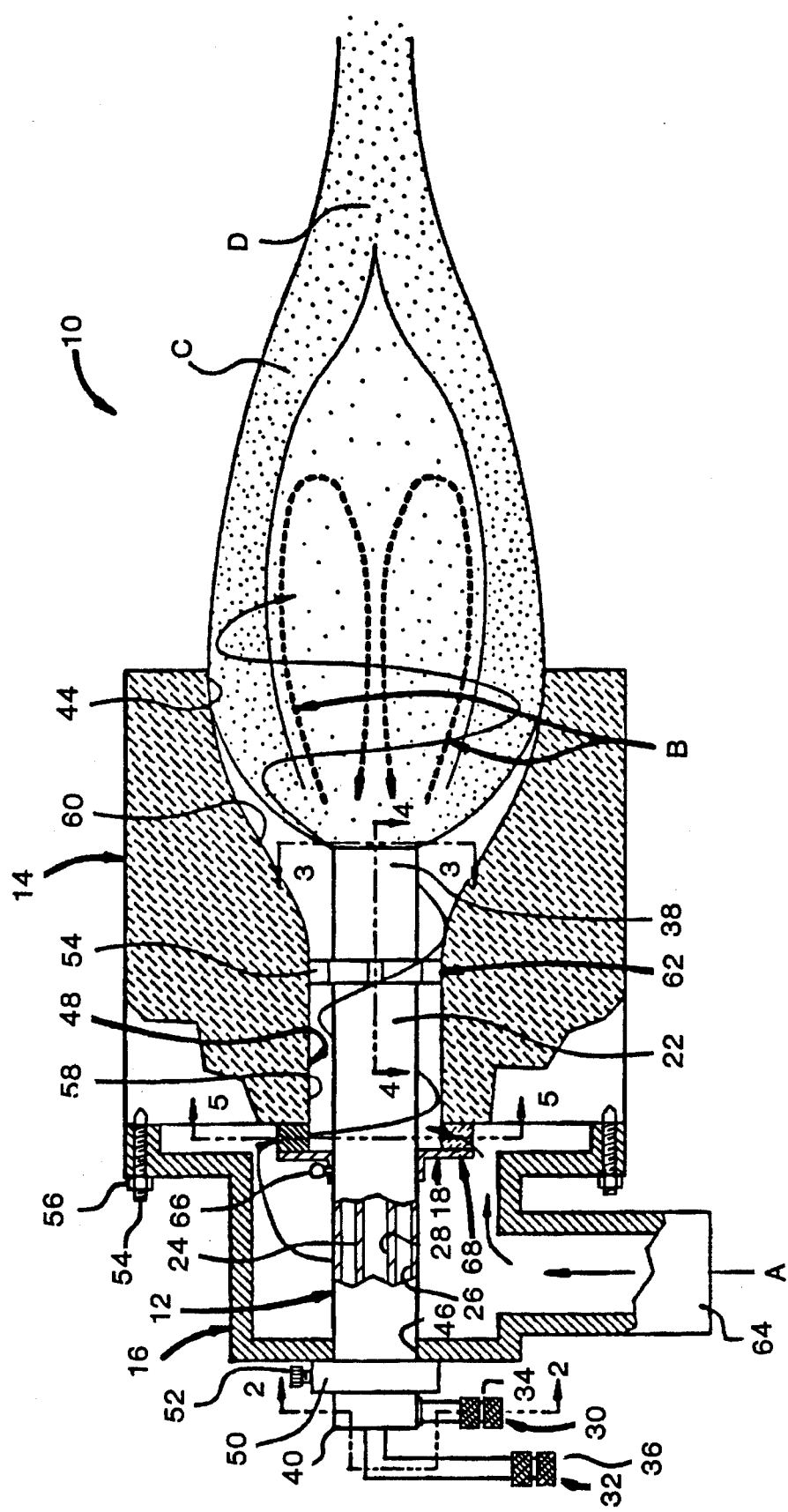
FIG. 1 is a sectional view of an air-oxy-fuel burner in accordance with the present invention with portions broken away.

With reference to the figures, a burner 10 in accordance with the present invention is illustrated. Burner 10 consists of an oxy-fuel burner set within a burner block 14 that serves an air shroud. Air designated by arrowhead A enters a wind box 16 and is swirled by an adjustable swirl block mechanism 18 which imparts a rotational movement to air A. At the same time, jets of fuel and oxidant burn in a first stage of combustion at a fuel-rich stoichiometry.

As air A swirls around the fuel and oxidant jets and the first stage of combustion, the unburned fuel and combustion products are met by an ever-increasing static air pressure as the air expands due to its swirling. The particles of unburned fuel and combustion products run up against the ever-increasing static pressure and are forced into a recirculation path shown by dashed arrowhead B at sufficiently high swirl ratios (axial momentum divided by tangential momentum) that are greater than approximately 0.6. The fuel-rich stoichiometry of the combustion products in the oxy-fuel flame of burner 12 increases flame luminosity (the flame being designated by reference C). Since the radiant power output of flame C increases with stoichiometric ratio in the first stage for a given total flow rate of fuel, the efficiency of heat transfer can also be said to increase for most industrial processes. The more effective radiant cooling of the flame C as well as the lower flame temperatures caused by off-stoichiometric operation in addition to the fuel-rich stoichiometry all contribute to low $NO_x$ formation rates in flame C formed from the nitrogen in the fuel (E) and/or oxidant stream (F) (FIG. 2).

The combustion of the fuel in the oxygen also expands and extends the first stage of combustion so that the air A being swirled mixes with the unburned fuel in a second stage of combustion designated by reference D located directly downstream of the first stage of combustion. This second stage of combustion is fuel-lean and therefore of low temperature so that the nitrogen present within the air will not tend to combine with oxygen to form $NO_x$. Therefore, overall, burner 10 is designed to efficiently burn the fuel in oxygen and air with reduced $NO_x$ emissions.

Figure 2:
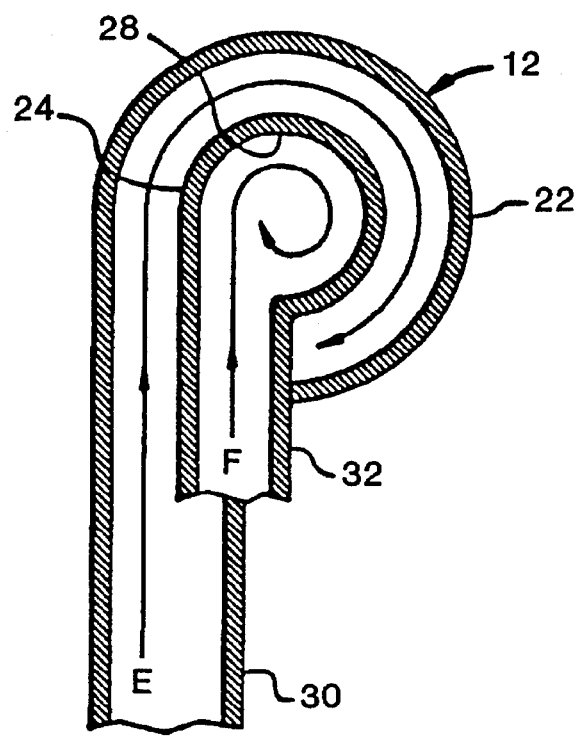
FIG. 2 is a sectional view taken along line 2—2 of FIG. 1.

With additional reference to FIG. 2, oxy-fuel burner 12 comprises an outer fuel conduit 22 and an inner oxygen conduit 24 coaxially located within outer fuel conduit 12. The outer and inner fuel and oxygen conduits 22 and 24 provide an outer, annular fuel passage 26 surrounding and inner oxygen passage 28. Fuel and oxygen are introduced into outer and inner fuel and oxygen passageways by way of fuel and oxygen inlets 30 and 32, respectively, incorporating quick connect and disconnect fittings 34 and 36. Thus, at a distal end 38 of oxy-fuel burner 12, an oxygen jet is expelled in close proximity to a surrounding fuel jet, which due to their proximity are convergent. Additionally, at a proximal end 40 of burner 12, it can be seen that the fuel and oxygen are tangentially introduced into outer and inner fuel and oxygen conduits of burner 12 to impart a rotation indicated by arrowheads E and F for the fuel and oxygen streams. The rotation aids in forming recirculation zone B.

Figure 3:
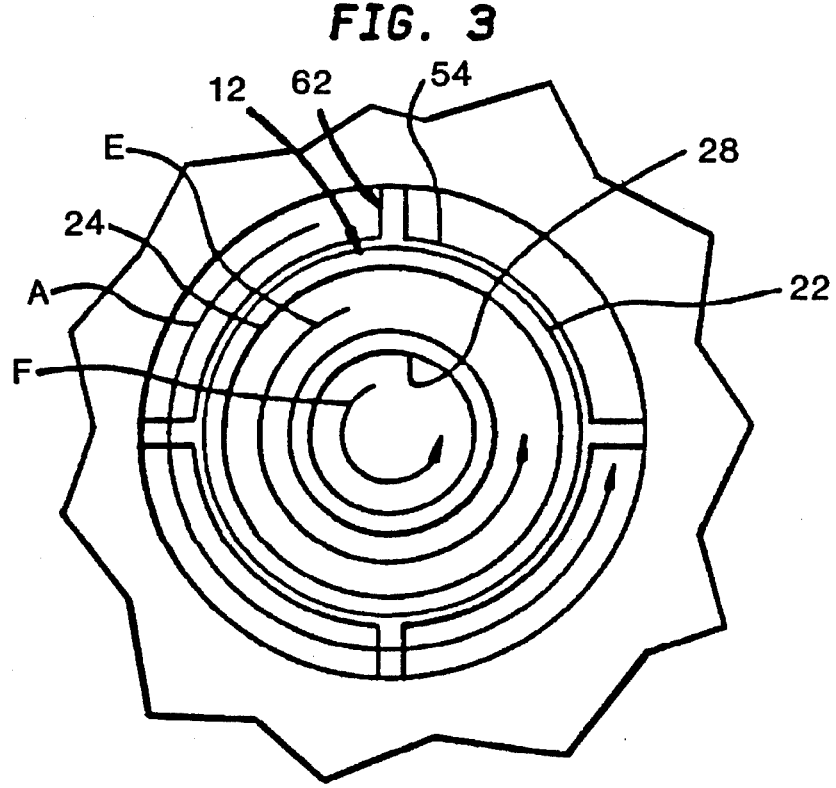
FIG. 3 is a sectional view taken along line 3—3 of FIG. 1.
Figure 3A:
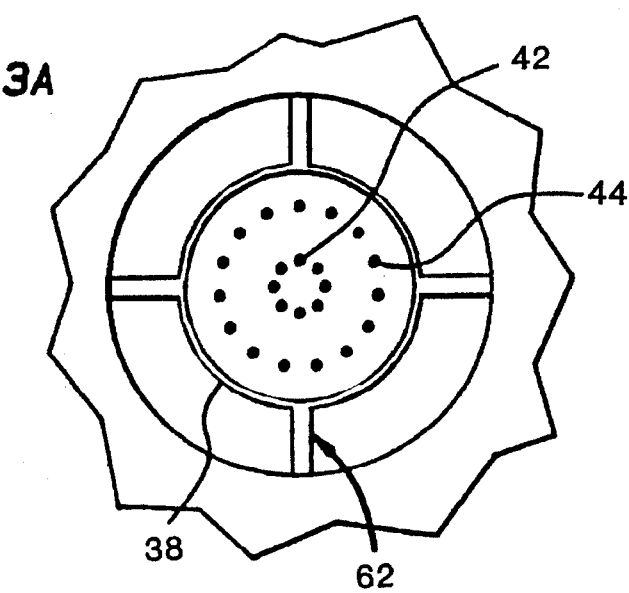
FIG. 3a is a seconal view of an alternative embodiment of a burner used in FIG. 1 when viewed from the same vantage as line 3—3 of FIG. 1.
Figure 4:
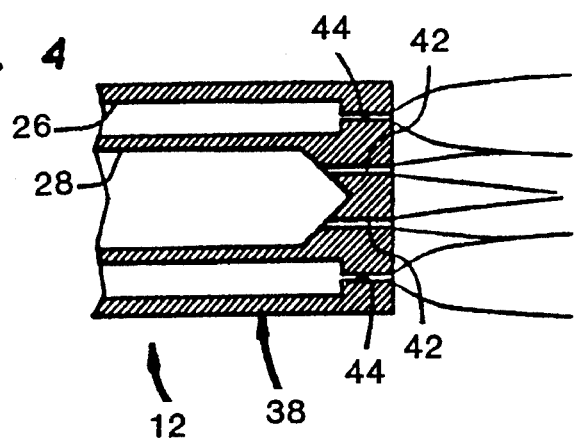
FIG. 4 is a sectional view of the alternative embodiment of the burner of FIG. 3a as viewed along line 4—4 of FIG. 1.

With reference to FIGS. 3A and 4, an alternative embodiment of oxy-fuel burner 12 is illustrated. Although not illustrated, fuel and oxygen conduits would be provided at the proximal end of such burner. They would differ from fuel and oxygen inlets 30 and 32 by not being offset to tangentially inject the fuel and oxygen. As such, there would be no swirl within the oxy-fuel burner. Outer fuel passageway 26 and inner oxygen passageway 28 terminate in distal end 38. Distal end 38 is provided with central oxygen bores 42 in communication with inner oxygen conduit 28 and an outer ting of fuel bores 44 in communication with outer oxygen conduit 26. Preferably, six or more bores for the oxygen and eight or more bores for the fuel are required to produce the convergent jets of fuel and oxygen.

Oxy-fuel burner 12 extends through a bore 46 provided within wind box 16 and a central passageway 48 defined within burner block 14 and is held in place by a collar 50 and set screw 52 arrangement connected to wind box 16. Wind box 16 is in turn attached to burner block 14 by provision of studs and hex nuts 54 and 56. Central passageway 48 of burner block 14 is provided with a throat section 58 and a divergent opening 60. Oxy-fuel burner 12 is supported within central passageway 48 by a spider 62 bearing against throat section 58 thereof.

Figure 5:
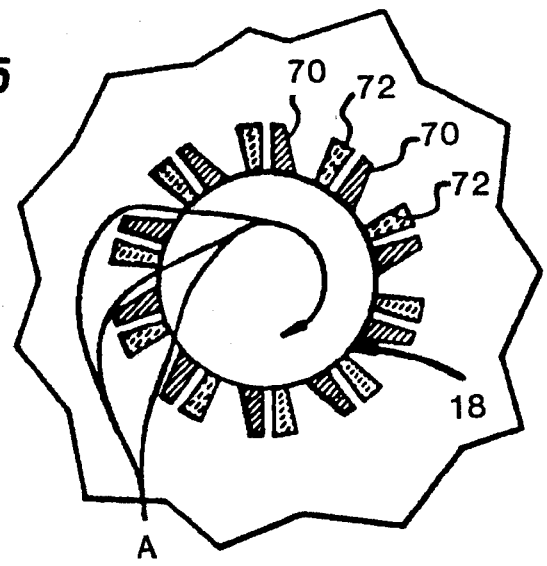
FIG. 5 is a sectional view of the air-oxy-fuel burner illustrated in FIG. 1 as viewed along line 5—5.

In order to complete combustion of the fuel, air enters wind box 16 through an inlet 64. The swirling motion of the air is imparted by an adjustable swirl block mechanism 18, as stated previously. Swirl block mechanism 18 is connected to oxy-fuel burner 12 by a collar and set screw arrangement 66. With reference to FIG. 5, an annular swirl plate 68 is provided with movable swirl blocks 70 attached thereto. Burner block 14 has fixed swirl blocks 72. As illustrated, the movable and fixed swirl blocks 70 and 72 act as vanes to force the air to enter throat 58 of central passageway 48 with tangential and axial components to induce the swirling motion of the air. Rotation of oxy-fuel burner 12 will came the spacing between fixed and movable swirl blocks 70 and 72 to change and thereby change the degree of swirl imparted to the air.

As a calculated example, a 8.5 million BTU/hr gas burner was designed in accordance with the embodiment illustrated in FIGS. 3A and 4. In the oxy-fuel burner illustrated in such embodiment, there would be provided 12 central oxygen bores, each of about 5.56 mm. in diameter, arranged in a ting and one central oxygen bore of about 12.7 mm. in diameter located at the central axis of the oxy-fuel burner. These central oxygen bores would be provided in lieu of the illustrated six central oxygen bores 42. Additionally, there would also be provided, in lieu of the illustrated outer ring of fuel bores 44, an outer ring of 16 fuel bores each of about 9.525 mm. in diameter. The outer diameter of such fuel burner would be about 6 cm. in diameter and throat section 58 of central passageway 48 would have an inner diameter of about 8.5 cm. so that the air would be swirled in an annulus having an inner diameter of about 6 cm. and an outer diameter of about 8.5 cm. Twice the amount of oxygen would be supplied by the air as compared with the flow of oxygen to the first stage of combustion. The total amount of oxygen supplied from the air and the oxygen to the oxy-fuel burner would be a stoichiometric amount. Assuming that the air contains 21% oxygen, then the swirling angle for the air would be about 49.5 degrees for such burner. If pure oxygen were used in place of the air, then the swirling angle would be about 83 degrees. An 83 degree swirling angle would have too small a forward component to project the second stage of combustion out in front and downstream of the first stage of combustion. As a result, the combustion would be radially stratified rather than projected. As the air is enriched with oxygen, the increase in swirl angle was seen to be very steep and one would not enrich the air with oxygen for the example burner beyond 50% because the swirl angle would rapidly climb to above about 70%. Swirl angles above about 70% make it difficult if not impossible to project the second stage of combustion and therefore the flame.

As can be appreciated, the behavior of other burner designs would differ somewhat from the foregoing example. However, it should be pointed out that oxygen enrichment levels for the air would be rapidly reached in any design where it would be near impossible to project a flame in the manner contemplated in the present invention.

Although the invention has been described relative to a preferred embodiment will occur to those skilled in the art that numerous additions, omissions and changes may be made without departing from the spirit and scope of the present invention.

I claim:

1. A method of burning fuel comprising:

introducing fuel and oxygen into a first state of combustion such that the fuel and the oxygen burn at a fuel-rich stoichiometry to produce unburned fuel and combustion products; and introducing the unburned fuel from the first stage of combustion and an oxidant more massive than said oxygen into a second stage of combustion such that combustion of the fuel is completed at fuel-lean stoichiometry;

the fuel and the oxygen being introduced into the first stage of combustion by forming convergent jets of the fuel and the oxygen;

the unburned fuel and the oxidant being introduced into the second stage of combustion by swirling the oxidant around the fuel and oxygen jets with tangential and axial momentums;

the tangential momentum of the oxidant being sufficient to form a recirculation zone in the first stage of combustion in which heated combustion products circulate at right angles to the swirl of the oxidant; and the axial momentum of the oxidant being sufficient to project the oxidant and therefore the second stage of combustion directly downstream of the first stage of combustion.

2. The method of claim 1 in which the oxidant comprises air.

3. The method of claim 1, further comprising swirling both the fuel and the oxygen such that the circulation is increased in the first stage of combustion.

4. An air-oxy fuel burner comprising:

a fuel burner having means for forming convergent fuel and oxygen jets such that the fuel and the oxygen are introduced into a first stage of combustion at a fuel-rich stoichiometry to form unburned fuel and combustion products; and an air shroud surrounding the fuel burner for supplying an oxidant more massive than said oxygen to complete combustion of the unburned fuel in a second stage of combustion having a fuel-lean stoichiometry;

the air shroud having means for swirling said oxidant around the fuel and oxygen jets with a sufficient tangential velocity that a recirculation zone is set up in the first stage of combustion in which the combustion products recirculate at right angles to the swirl of the oxidant and with a sufficient axial velocity that the oxidant and therefore the second stage of combustion is projected directly downstream of the first stage of combustion.

5. The air-oxy-fuel burner of claim 4, wherein the air shroud is formed by a burner block.

6. The air-oxy-fuel burner of claim 4 wherein the fuel burner has opposed proximal and distal ends, central and annular passageways communicating between the proximal and distal ends, an outer ring of bores defined in the distal end and in communication with the annular passageway, an inner ring of bores in communication with the central passageway, an oxidant inlet in communication with the central passageways such that jets of oxidant emanate from the central bores, and a fuel inlet in communication with the annular passageway such that the fuel jets emanate from the outer ring of bores.

7. The burner of claim 4 in which the fuel burner comprises an elongated body having coaxial, inner and outer oxygen and fuel passages and means within the oxygen and fuel passages for swirling the oxygen and the fuel such that the recirculation is increased within the first stage of combustion.

* * * * *